United States Patent [19]

Schmitzer et al.

[11] 4,060,579
[45] Nov. 29, 1977

[54] METHOD FOR THE CONTINUOUS FORMING OF FOAM BLOCKS

[75] Inventors: Willi Schmitzer, Birlinghoven; Heinz Kisteneich, St. Augustin; Ferdinand Proksa, Bergisch-Neukirchen, all of Germany

[73] Assignee: Maschinenfabrik Hennecke GmbH, Leverkusen, Germany

[21] Appl. No.: 548,934

[22] Filed: Feb. 11, 1975

Related U.S. Application Data

[63] Continuation of Ser. No. 371,812, June 20, 1973, abandoned.

[30] Foreign Application Priority Data

June 24, 1972 Germany .................. 2231084

[51] Int. Cl.² .................. B29D 27/04
[52] U.S. Cl. .................. 264/51; 264/216; 264/DIG. 13; 425/4 C
[58] Field of Search .................. 264/54, 51, 45.8, 46.2, 264/46.3, DIG. 13, 216

[56] References Cited

U.S. PATENT DOCUMENTS

| 2,957,207 | 10/1960 | Roop et al. ................ 264/54 |
| 3,231,439 | 1/1966 | Voelker ................ 264/46.2 X |
| 3,278,659 | 10/1966 | Willy ................ 264/54 |
| 3,325,573 | 6/1967 | Boon et al. ................ 264/54 |
| 3,325,823 | 6/1967 | Boon ................ 264/54 X |
| 3,488,800 | 1/1970 | Kornylak ................ 264/54 X |
| 3,560,599 | 2/1971 | Ferstenberg ................ 264/54 |
| 3,604,054 | 9/1971 | Eisenmann et al. ................ 264/45.8 X |
| 3,719,734 | 3/1973 | Petzetakis ................ 264/51 |
| 3,734,668 | 5/1973 | Porter ................ 264/51 |
| 3,786,122 | 1/1974 | Berg ................ 264/54 |
| 3,840,629 | 10/1974 | Marjoram ................ 264/54 |
| 3,887,670 | 6/1975 | Porter ................ 264/54 X |

FOREIGN PATENT DOCUMENTS 745,121  10/1966  Canada .................. 264/45.8

*Primary Examiner*—Philip Anderson
*Attorney, Agent, or Firm*—Gene Harsh; Joseph C. Gil; William E. Parry

[57] ABSTRACT

Foam blocks are continuously produced on a conveyor belt having lateral boundaries, the application zone for the mixture being adjustable in its inclination, and a feed means for the cover sheet of the conveyor belt being provided before the point at which the mixture is applied.

8 Claims, 4 Drawing Figures

METHOD FOR THE CONTINUOUS FORMING OF FOAM BLOCKS

This is a continuation, of application Ser. No. 371,812, filed June 20, 1973 and now abandoned.

This invention relates to a machine for the continuous production of foam blocks, consisting of an elongated conveying surface which is divided into a zone for the application of a reaction mixture and a subsequent zone for the foaming process, an offwinding station located before the application zone provided for a continuous cover sheet, and an applicator arranged above the application zone; at least the foaming zone consisting of a continuous, drivable conveyor belt with lateral boundaries.

Foam blocks are generally produced in machines consisting of a continuous conveyor belt which is inclined slightly downwards in the conveying direction. The angle of inclination is within the range of from 4° to 10°. Different mixture compositions often with different reaction times, are required, since foam blocks differing in quality and properties generally have to be produced on these conveyor belts. The inclination of the conveyor belt has to be adapted accordingly. Since the conveyor belts are of considerable lengths, the expense involved in their inclination adjustment is extremely high. Furthermore, these machines do not avoid the undesirable overcoating of the mixture so that, as seen in cross section, it is possible to detect layers which began their reaction at different times. This results in the formation of an inhomogeneous foam block with corresponding reductions in quality. It is also known to provide machines of this kind with a bend between the application zone and the foaming zone so that the application zone is in a downward inclination to the foaming zone. However, this improvement does not eliminate the danger of overcoating. Additionally, the application zone is not adjustable in its inclination and the cover sheet is merely carried along by the conveyor belt.

Accordingly, an object of this invention is to provide a machine in which there is no need to adjust the entire conveyor belt in regard to its inclination and which, in addition, avoids the danger of overcoating. According to the invention, this object is achieved by providing a machine having a) an application zone that is adjustable in its inclination with respect to the foaming zone and b) a feeder unit for a continuous cover sheet and which is associated with the application zone before the point at which the mixture is introduced.

It is already clear from the known machines that the application zone and the foaming zone merge with one another. In the present invention, however, these zones are separated more distinctly from one another by the bend situated between the adjustable-inclination application zone and the fixed foaming zone. Nevertheless, especially when quickly reacting components are used, the foaming reaction may start already in the application zone. There is no exact separation line between application zone and foaming zone in regard of the reaction process. The foaming zone is fixedly mounted so that it cannot be adjusted in its inclination which provides for considerable simplification in terms of design, because this part of the machine is placed under the greatest strain by the expanding foam and is much larger in its overall size than the application zone. By means of the adjustment mechanism, which can consist for example of a standard hydraulic cylinder, the application zone can be so adjusted that it can be adapted to the reaction time of different foam compositions. If allowance is also made for viscosity which the liquid mixture applied shows, overcoating can largely be eliminated.

The feeder unit of the invention for the cover sheet is essential because it prevents the cover sheet from being lifted off at the bend that exists between the two zones as would be the case if the cover sheet were pulled by the driven conveyor belt under the load applied. The feed rate of the feeder unit must be synchronized with the speed of the conveyor belt, otherwise the cover sheet would tear or be dragged along. The feeder, as will be more fully explained later in this application acts to unwind the cover sheet from its roll. The weight of the reaction mixture which is applied to the cover sheet subsequent to the sheet passing through the feeder unit acts to keep the cover sheet in contact with the surface of the coating zone.

In a first embodiment of the invention, the application zone is in the form of an extension of the conveyor belt. The conveyor belt is generally a plate conveyor belt the individual plates of which are connected together and the belt traveling on rollers in guide rails. No difficulties are involved in guiding the upper flight of the conveyor belt because the guide rails can be pivotally mounted at the bend so that the application zone can be swung up and down. Any differences which this may produce in the length of the conveyor belt can be compensated by tension rollers.

In a second embodiment of the invention, the application zone consists of a single plate. Although this plate is simpler in terms of design than the extension of the conveyor belt according to the first embodiment, it does involve the problem of friction generated between the cover sheet and the surface of the plate.

The feeder unit preferably consists of a contact roller which may be a shaft provided with a rotatable rubber cylinder or several rotatable rubber discs. By applying adequate pressure with the contact roller to the cover sheet the cover sheet will press against the conveyor belt and the resulting friction will result in the conveyor belt pulling the cover sheet along with it thus providing a continuous feeding process for the cover paper.

In the second embodiment, however, where the application zone is a plate rather than a portion of a continuous conveyor system a drive system for the contact roller must be provided to ensure the continuous feeding of the cover paper. To accomplish this the feeder unit is the same as described above except that the rubber cylinder or discs are rotated by either a drive motor or by a chain and gear wheel that is connected to the drive mechanism of the conveyor system of the foam section. Where a drive system is provided for the contact roller the feed rate of the roller must be adapted to the delivery rate of the conveyor belt.

According to another embodiment, the feeder unit comprises a pair of parallel rollers one of which may be separately driven. The rollers are arranged so that the cover sheet passes between them and is advanced by the rolling effect of the rollers. This embodiment is particularly suitable in cases where a plate is used in the application zone because, in this case, the friction between the plate and the cover sheet is minimized. It is also possible to use a pair of rollers in the case of an extension of the conveyor belt for the application zone, in which case the second roller is arranged underneath the plate belt in such a way that the plate belt is supported by this roller when the upper roller presses against it. Naturally, the lower roller must consist of individual components so that any guide rails present for the rollers of the plate belt are not interrupted.

Two exemplary embodiments of the machine according to the invention are illustrated purely diagrammatically in the accompanying drawings and described in detail below. In the accompanying drawings.

Figure 1:
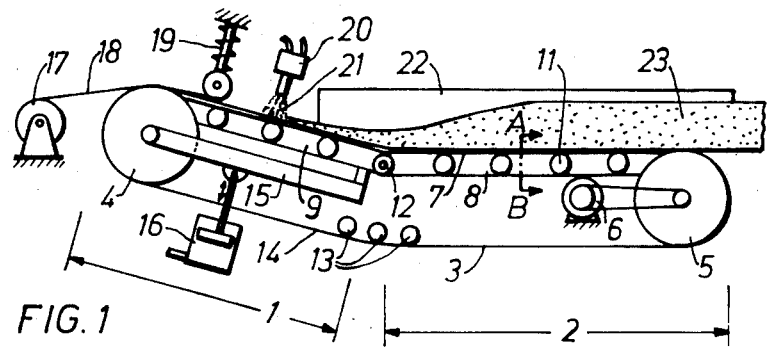
FIG. 1 shows a first embodiment in which the application zone is in the form of an extension of the conveyor belt.
Figure 2:
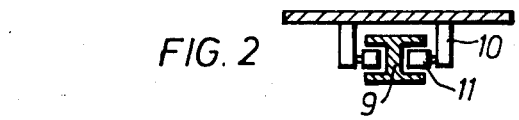
FIG. 2 shows a detail of FIG. 1 in section on the line A-B.

In FIGS. 1 and 2, the machine is divided into an application zone 1 and a foaming zone 2. A continuous conveyor belt 3, consisting of individual plates (not shown), passes over reversing rollers 4 and 5, the roller 5 being provided with a drive 6. I-rails 8 and 9 arranged below the upper flight 7 act as guides for the rollers 11 mounted on the arms 10 of the plates. The I-rails 8 and 9 are pivotally connected by suitable means at the bend 12. Guide rollers 13 guide the lower flight 14 of the conveyor belt 3. The mounting of the reversing roller 4 and the I-rails 9 (several rails are, of course arranged over the width of the machine) are joined to a supporting frame 15 on which a hydraulic adjusting cylinder 16 acts as an adjusting mechanism. The reversing roller 4 is preceded by an offwinding station 17 for a cover sheet 18 of paper. The cover sheet 18 is offwound by means of a contact roller 19 acting as a feed means. In the embodiment of FIG. 1, the contact roller 19 is driven by the movement of the conveyor belt 3. A liquid reaction mixture 21 which forms polyurethane foam is applied by means of an applicator 20 subsequently reacting out to form a block 23. The block 23 is supported by lateral boundaries 22.

In FIG. 3, the machine is again divided into an application zone 31 and a foaming zone 32. The application zone 31 is formed by a plate 33. The foaming zone 32 consists of a continuous conveyor belt 34 which is horizontally arranged. The belt 34 passes over reversing rollers 35 and 36. The roller 36 is connected to a drive motor 37. Lateral boundaries 38 support the foam block 39 during its formation. The plate 33 is mounted to pivot about the joint 40. Its inclination can be adjusted by an adjusting mechanism 41 in the form of a hydraulic cylinder. A coversheet 45 is offwound from an offwinding station 42 by a feeder unit 43 in the form of a contact roller with a drive motor 44, at the same speed as the conveyor belt 34. A reaction mixture 47 forming a polyurethane foam is applied by means of an applicator 46.

Figure 3:
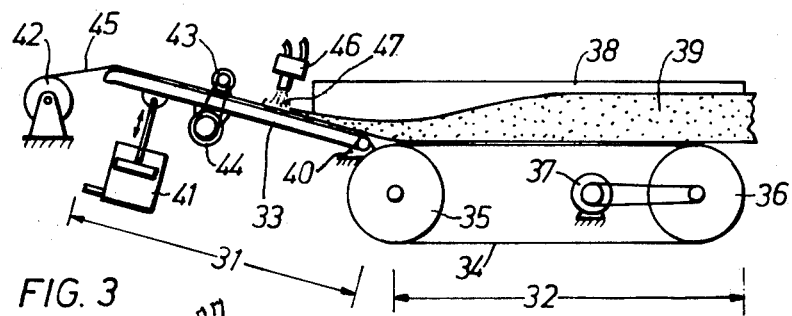
FIG. 3 shows a second embodiment in which the application zone is in the form of a plate.
Figure 4:
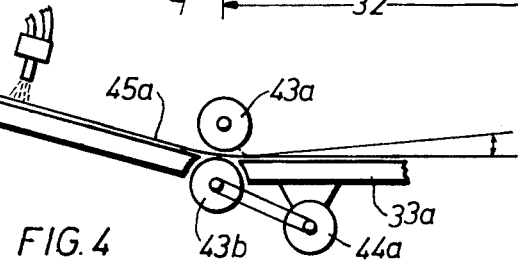
FIG. 4 shows a particular embodiment of the feeder unit in the form of a pair of rollers.

FIG. 4 is a modification of the embodiment shown in FIG. 3. The plate 33a is interrupted. Arranged in the interruption is a second roller 43b which co-operates with the contact roller 43a arranged above it so that the cover sheet 45a is offwound. The roller 43b is driven by the drive 44a.

In all embodiments, the inclination of the application zone can be optimally adjusted on the basis of empirically determined values.

Although the invention has been described with reference to the specific embodiments thereof, it is not intended to be limited to those embodiments, but on the contrary, is intended to embrace all alternatives, modifications and variations as fall within the spirit and scope of the appended claims.

What is claimed is:

1. A method of continuously producing foam blocks comprising:
   a. providing an elongated conveying surface divided into a first zone and a second zone
      i. said first zone being inclined at a downward angle to the horizontal in the direction of the work,
      ii. said second zone being substantially horizontal and forming a less than 180° angle with said first zone as measured between the top surfaces, and
      iii. at least said second zone comprises an endless drivable conveyor belt,
   b. positively feeding a continuous cover sheet to the surface of said first zone,
   c. continuously depositing a foamable reaction mixture on top of said cover sheet in said first zone,
   d. maintaining freshly deposited mixture in said first zone for a short enough time that it does not begin to foam substantially, and
   e. allowing the mixture to foam in said second zone.

2. The process of claim 1 wherein the angle of inclination of said first zone is adjusted so as to maintain the reaction mixture in the first zone for the desired period of time.

3. The process of claim 1 wherein the reaction mixture is partially conveyed through said first zone by the action of an extension of the endless drivable conveyor belt which comprises said second zone.

4. The process of claim 1 wherein the reaction mixture is conveyed through said first zone substantially by the force of gravity, said zone being comprised of a plate.

5. The process of claim 1 wherein the cover sheet is fed to the first zone by a contact roller.

6. The process of claim 5 wherein said contact roller is driven.

7. The process of claim 1 wherein the cover sheet is fed to the first zone by the rolling action of two parallel rollers.

8. The process of claim 7 wherein one of the rollers is driven.

* * * * *